US010135179B2

(12) United States Patent
Cooper et al.

(10) Patent No.: US 10,135,179 B2
(45) Date of Patent: Nov. 20, 2018

(54) POWER SUPPLY SYSTEM

(71) Applicant: Sunbeam Corporation Pty Ltd, Botany, New South Wales (AU)

(72) Inventors: Peter Cooper, Botany (AU); Andrew Chan, Botany (AU); Maxim Guyatt, Botany (AU); Andrew Morgan, Botany (AU); Christopher Elliott, Botany (AU); Mark Whitcombe, Botany (AU)

(73) Assignee: Sunbeam Corporation Pty Ltd, Botany, New South Wales (AU)

( * ) Notice: Subject to any disclaimer, the term of this patent is extended or adjusted under 35 U.S.C. 154(b) by 0 days.

(21) Appl. No.: 15/525,039

(22) PCT Filed: Nov. 5, 2015

(86) PCT No.: PCT/AU2015/050691
§ 371 (c)(1),
(2) Date: May 5, 2017

(87) PCT Pub. No.: WO2016/070244
PCT Pub. Date: May 12, 2016

(65) Prior Publication Data
US 2017/0331223 A1  Nov. 16, 2017

(30) Foreign Application Priority Data

Nov. 5, 2014  (AU) .............................. 2014904457

(51) Int. Cl.
*H01R 11/30* (2006.01)
*H01R 13/62* (2006.01)
*H01R 13/627* (2006.01)

(52) U.S. Cl.
CPC ..... *H01R 13/6205* (2013.01); *H01R 13/6276* (2013.01)

(58) Field of Classification Search
CPC ........................ H01R 13/6205; H01R 13/6276
USPC .............................................. 439/38, 39, 40
See application file for complete search history.

(56) References Cited

U.S. PATENT DOCUMENTS 3,521,216 A * 7/1970 Tolegian ............ H01R 13/6205
439/152
3,786,391 A  1/1974 Mathauser
(Continued)

FOREIGN PATENT DOCUMENTS

| GB | 2510045 | 7/2014 |
|---|---|---|
| WO | 1995008204 | 3/1995 |
| WO | 1996/022718 A1 | 8/1996 |

*Primary Examiner* — Abdullah Riyami
*Assistant Examiner* — Nelson R Burgos-Guntin
(74) *Attorney, Agent, or Firm* — Husch Blackwell LLP

(57) ABSTRACT

A system for providing power to a cordless appliance is provided. The system includes a coupler, and a complementary coupler on the appliance is also present. The coupler has symmetrically configured concentric power terminals, which are connected to a main power source in use, and a magnetic coupling region disposed concentrically around an outer periphery of the power terminals. The complementary coupler has complementary power terminals configured to engage with the symmetrically configured concentric power terminals of the coupler, and an engaging region disposed concentrically around an outer periphery of the complementary terminals. A magnetic force provides a mutual attraction between the magnetic coupling region and the engaging region, thereby engaging the power terminals and complementary power terminals and establishing an electrical connection between the coupler and the appliance.

20 Claims, 20 Drawing Sheets

(56) References Cited

U.S. PATENT DOCUMENTS

| | | | | |
|---|---|---|---|---|
| 3,808,577 A * | 4/1974 | Mathauser | H01R 13/6205 | 439/180 |
| 5,551,882 A | 9/1996 | Whiteman, Jr. et al. | | |
| 6,030,229 A * | 2/2000 | Tsutsui | H01R 13/6205 | 336/90 |
| 7,341,458 B1 * | 3/2008 | Koh | H01R 13/2421 | 439/39 |
| 7,874,844 B1 * | 1/2011 | Fitts, Jr. | H01R 31/06 | 439/218 |
| 8,460,008 B1 * | 6/2013 | Lin | H01R 13/6205 | 439/39 |
| 8,900,009 B2 * | 12/2014 | Hornick | H01R 13/73 | 248/288.51 |
| 2002/0086559 A1 * | 7/2002 | Dalmau Ferrerfabrega | H01R 13/6205 | 439/39 |
| 2007/0072443 A1 * | 3/2007 | Rohrbach | H01R 13/6205 | 439/39 |
| 2013/0040469 A1 * | 2/2013 | Hsu | H01R 13/6205 | 439/39 |
| 2013/0303000 A1 | 11/2013 | Witter et al. | | |
| 2014/0120746 A1 * | 5/2014 | Persion | G02B 6/3817 | 439/39 |
| 2014/0357096 A1 * | 12/2014 | Kuo | H01R 13/6205 | 439/40 |
| 2015/0093922 A1 * | 4/2015 | Bosscher | H01R 13/665 | 439/39 |
| 2015/0171549 A1 * | 6/2015 | Wang | H01R 13/6205 | 439/39 |
| 2015/0194764 A1 * | 7/2015 | Magana | H01R 13/6205 | 439/39 |
| 2015/0364863 A1 * | 12/2015 | Andrus | A61M 1/127 | 439/39 |
| 2016/0040825 A1 * | 2/2016 | Franklin | F16M 13/02 | 439/39 |

* cited by examiner

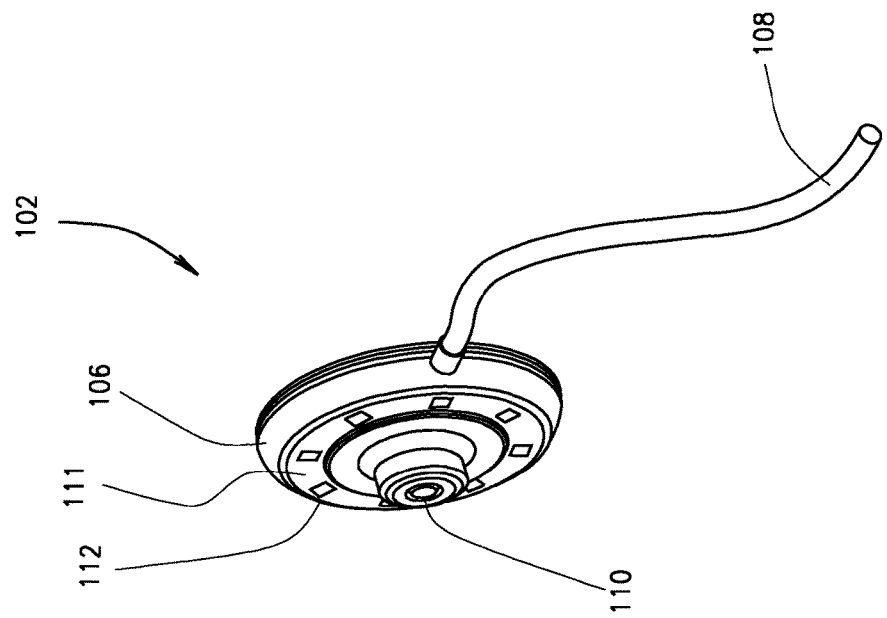
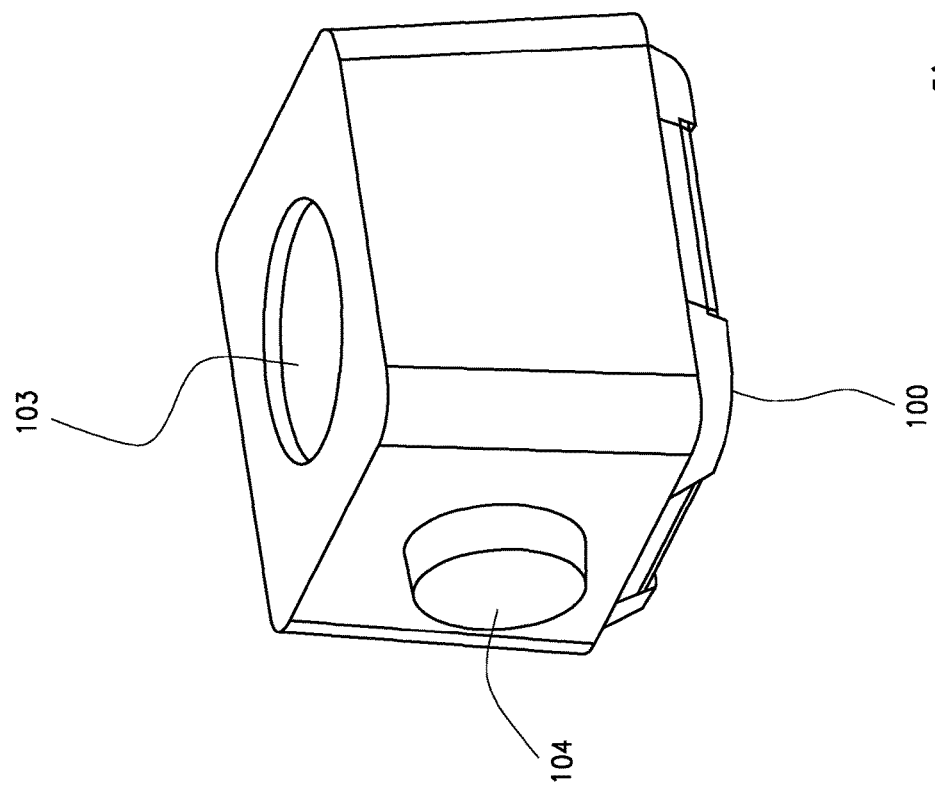
Figure 1

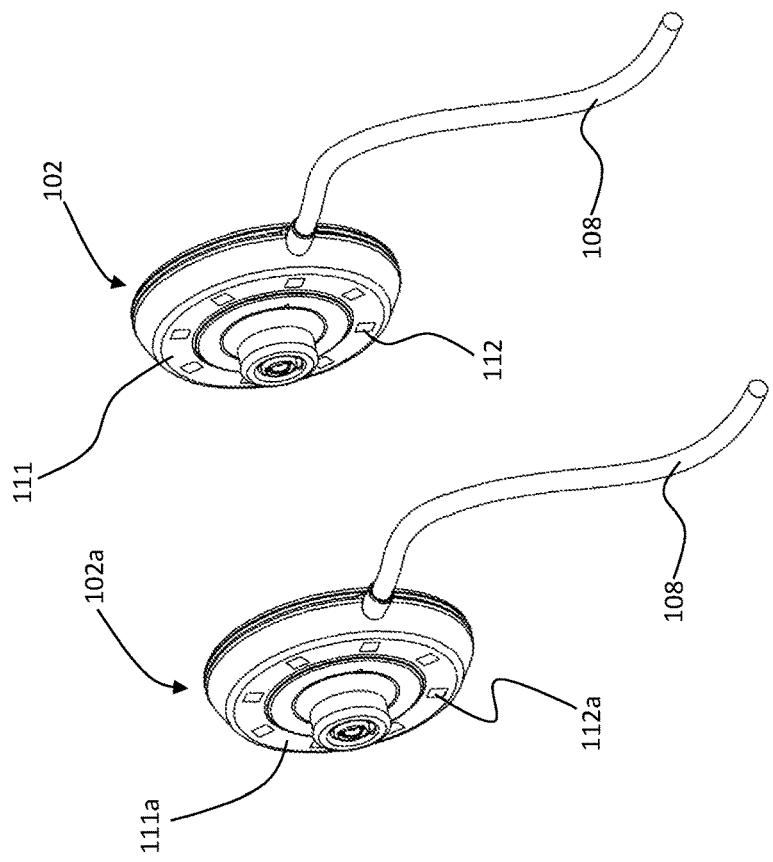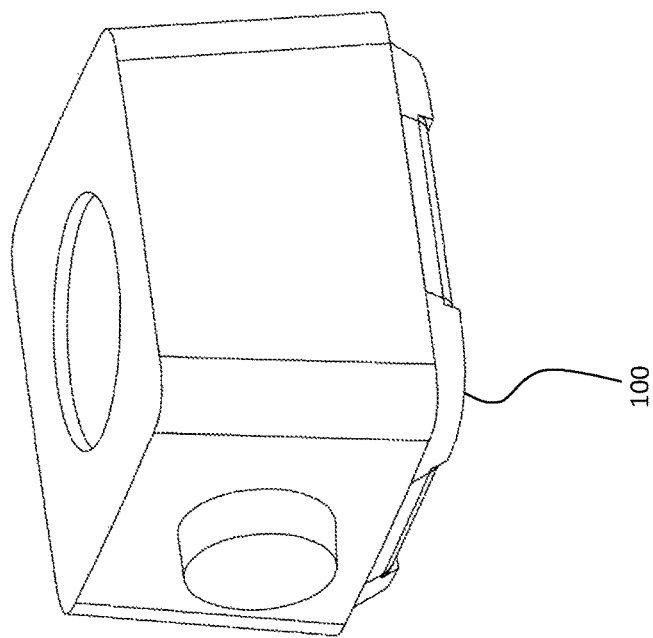
Figure 8

POWER SUPPLY SYSTEM

CROSS-REFERENCE TO RELATED APPLICATIONS

This application is a U.S. National Phase Application of International Application No. PCT/AU2015/050691 filed on Nov. 5, 2015, which claims priority of and the benefit of Australian Application No. 2014904457, entitled "POWER SUPPLY COUPLER," filed Nov. 5, 2014. The full disclosures of International Application No. PCT/AU2015/050691 and Australian Application No. 2014904457 are incorporated herein by reference.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

Field of the Invention

The present disclosure relates to a system for providing mains power to cordless appliances. In particular, the disclosure relates to a system including a coupler for connecting to and disconnecting from a cordless appliance.

Description of Related Art Including Information Disclosed Under 37 CFR 1.97 and 1.98

Cordless appliances, such as kettles, blenders or mixers, have removable power cables or cords that can be connected or disconnected to the main body of the electrical appliances. For example, standardised IEC connectors are commonly used on many cordless appliances. These connectors have a single orientation and therefore users must align the plug with the socket on the appliance. However, users may have difficulty locating the connector to the corresponding socket on the appliance when the socket is out of sight. Additionally, standard IEC connectors can be difficult to manually insert and remove.

Other appliance connectors are provided on a base which allows for a 360 degree connection with the appliance, for example the connector base used with cordless kettles. The weight of the kettle is used to ensure electrical contact between the base of the kettle and the connector. However, there are certain disadvantages with this arrangement. For example, if used with large or heavy appliances, the weight of the appliance motor may make it difficult to move. Furthermore, the appliance may be unstable as it is resting on the connector base rather than a bench top or table surface.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

BRIEF SUMMARY OF THE INVENTION

In one aspect, the disclosure relates to a system for providing mains power to a cordless appliance. The system comprises:
  a coupler comprising
    symmetrically configured concentric power terminals that in use are connected to a mains power source; and
    a magnetic coupling region disposed concentrically around an outer periphery of the power terminals;
  a complementary coupler on the appliance, comprising
    complementary power terminals configured to engage with the symmetrically configured concentric power terminals of the coupler; and
    an engaging region disposed concentrically around an outer periphery of the complementary terminals, wherein a magnetic force provides a mutual attraction between the magnetic coupling region and the engaging region, thereby engaging the power terminals and complementary power terminals and establishing an electrical connection between the coupler and the appliance.

The engaging region may be ferromagnetic or may comprise one or more permanent magnets or electro-magnets. The engaging region and the magnetic coupling region may be annular in shape. The magnetic coupling region may comprise a plurality of permanent magnets defining an annular area. In use, the complementary coupling on the appliance may be provided on a non-horizontal surface, preferably a side surface. The power terminals may comprise a 3-pole or a 5-pole connection.

The system may further comprise an adapter base comprising a planar surface that in use supports the cordless appliance, the planar surface defining an aperture, wherein in use the coupler is positioned such that the concentric power terminals are accessible via the aperture such that the complementary power terminals on the cordless appliance are engageable with the concentric power terminals to establish an electrical connection between the coupler and the cordless appliance.

The coupler may have a body comprising an upper housing and a lower housing, wherein a gap is formed between said upper housing and said lower housing so as to extend along at least a portion of the perimeter of the coupler body and thereby enable liquid to flow out of the coupler body.

In another aspect, the disclosure relates to a system for providing mains power to a cordless appliance, comprising:
  a coupler comprising
    symmetrically configured concentric power terminals that in use are connected to a mains power source; and
    an adapter base comprising a planar surface that in use supports the cordless appliance, the planar surface defining an aperture,
    wherein in use the coupler is positioned such that the concentric power terminals are accessible via the aperture such that complementary power terminals on the cordless appliance are engageable with the concentric power terminals to establish an electrical connection between the coupler and the cordless appliance.

The coupler may comprise a magnetic coupling region disposed concentrically around an outer periphery of the power terminals.

The magnetic coupling region may be configured to provide a mutual attraction between the magnetic coupling region and a complementary engaging region disposed concentrically around the complementary power terminals on the cordless appliance, thereby engaging the power terminals and establishing an electrical connection between the coupler and the cordless appliance.

The magnetic coupling region may be configured to provide a mutual attraction between the magnetic coupling region and a complementary engaging region disposed concentrically around the aperture on the adapter base, thereby engaging the coupler and the adapter base.

In yet a further aspect, the disclosure relates to a system for providing mains power to a cordless appliance, comprising:
 a coupler comprising symmetrically configured concentric power terminals that in use are connected to a mains power source; and
 a complementary coupler on the appliance, comprising complementary power terminals configured to engage with the symmetrically configured concentric power terminals of the coupler;
 wherein the coupler has a body comprising an upper housing and a lower housing, and a gap is formed between said upper housing and said lower housing so as to extend along at least a portion of the perimeter of the coupler body and thereby enable liquid to flow out of the coupler body.

In yet another aspect, the disclosure relates to a system for providing mains power to a cordless appliance, comprising:
 a coupler comprising:
 symmetrically configured concentric power terminals that in use are connected to a mains power source, and
 first coupling means disposed concentrically around an outer periphery of the power terminals; and
 an adapter base comprising
 a planar surface that in use supports the cordless appliance, the planar surface defining an aperture, and
 a second coupling means disposed around the aperture, wherein the first and second coupling means interact to attach the coupler to the adapter base such that the concentric power terminals are accessible via the aperture such that complementary power terminals on the cordless appliance are engageable with the concentric power terminals to establish an electrical connection between the coupler and the cordless appliance.

The first coupling means may comprise a magnetic coupling region, which may comprise one or more permanent magnets or electromagnets. The second coupling means may comprise a ferromagnetic material, or a permanent magnet. Alternatively or additionally, the first and second coupling means may comprise a bayonet attachment, one or more snap clips or a 360 degree ball lock.

The adapter base may comprise a cable to connect to the mains power source and a housing in which the cable may be retracted.

In yet a further aspect, the disclosure relates to a coupler for providing mains power to cordless appliances in a plurality of attachment configurations, the coupler comprising symmetrically configured concentric power terminals that in use are connected to a mains power source, and a magnetic coupling region disposed concentrically around an outer periphery of the power terminals;
 wherein in a first attachment configuration the coupler is attached to a complementary coupler on a first cordless appliance, the complementary coupler having complementary power terminals configured to engage with the symmetrically configured concentric power terminals of the coupler and a first engaging region disposed concentrically around an outer periphery of the complementary terminals, wherein a magnetic force provides a mutual attraction between the magnetic coupling region and the first engaging region, thereby engaging the power terminals and complementary power terminals and establishing an electrical connection between the coupler and the first cordless appliance.

In a second attachment configuration the coupler may be attached to an adapter base having a planar surface that in use supports a second cordless appliance, the planar surface defining an aperture with a second engaging region disposed around the aperture, wherein a magnetic attraction between the magnetic coupling region and the second engaging region acts to attach the coupler to the adapter base such that the concentric power terminals are accessible via the aperture such that complementary power terminals on the second cordless appliance are engageable with the concentric power terminals to establish an electrical connection between the coupler and the second cordless appliance.

In a third attachment configuration, the coupler may be attached to a second adapter base having a planar surface that in use supports a third cordless appliance, the planar surface defining an aperture, wherein in use the coupler and the second adapter base are co-located such that the concentric power terminals are accessible via the aperture and a magnetic attraction between the magnetic coupling region and a second engaging region on the third cordless appliance acts to attach the coupler to the third cordless appliance such that complementary power terminals on the third cordless appliance are engageable with the concentric power terminals to establish an electrical connection between the coupler and the third cordless appliance.

In yet another aspect, the disclosure relates to a stacked magnetic coupling system for providing mains power to a plurality of appliances, comprising: a first coupler comprising
 a first set of symmetrically configured power terminals that in use are connected to a mains power source, and
 a first magnetic coupling region disposed concentrically around the first set of power terminals;
 a second coupler comprising
 complementary terminals configured to engage with the first set of power terminals; and
 a first engaging region disposed concentrically around the complementary terminals, wherein a magnetic force provides a mutual attraction between the first magnetic coupling region and the first engaging region, thereby engaging the first set of power terminals and the complementary terminals and establishing an electrical connection between the first coupler and the second coupler;
 a second set of symmetrically configured power terminals that in use are coupled to corresponding terminals on a further coupler or on a first appliance;
 a second magnetic coupling region disposed concentrically around the second set of power terminals, wherein the second magnetic coupling region provides a mutual attraction with a corresponding second engaging region on the further coupler or the first appliance, thereby engaging the second set of power terminals and the corresponding terminals and establishing an electrical connection between the second coupler and the further coupler or the first appliance; and a lead providing an electrical connection between the second coupler and a second appliance.

The engaging regions may be magnetic or magnetisable. The first and second magnetic coupling regions may be disposed around the outer periphery of first and second set of power terminals. The couplers may be symmetrically configured so that they are able to connect at any (0-360 degree) coupling orientation. The system may include a lead which terminates in a coupler corresponding to the first coupler.

As used herein, except where the context requires otherwise, the term "comprise" and variations of the term, such as "comprising", "comprises" and "comprised", are not intended to exclude further additives, components, integers or steps.

Further aspects of the present invention and further embodiments of the aspects described in the preceding paragraphs will become apparent from the following description, given by way of example and with reference to the accompanying drawings.

BRIEF DESCRIPTION OF THE SEVERAL VIEWS OF THE DRAWINGS

FIG. 1 shows a coupler according to the present disclosure with an appliance base.

FIGS. 8 to 11 show a "pass-through" arrangement of the power couplers.

DETAILED DESCRIPTION OF THE INVENTION

Figure 2:
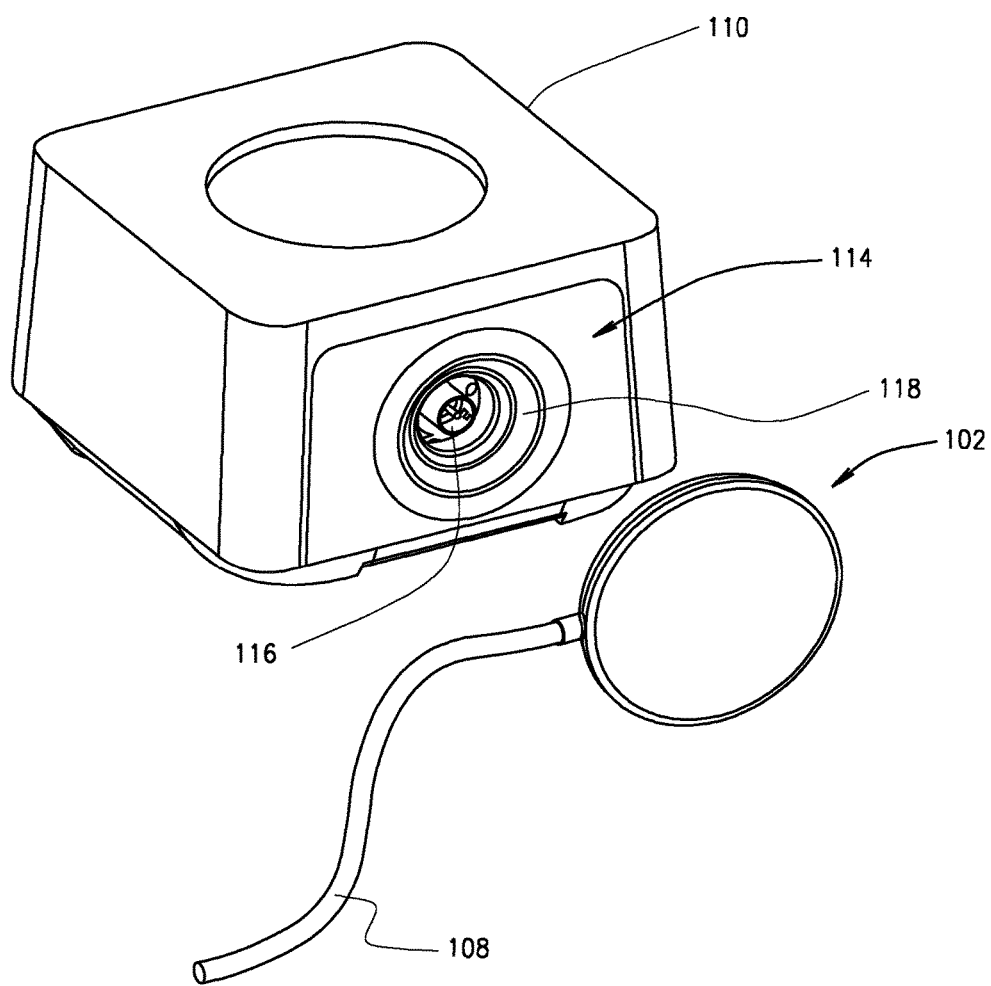
FIG. 2 shows a rear perspective view of the coupler and the appliance base of FIG. 1.

FIG. 1 shows a coupler 102 and an appliance base 100 for a cordless appliance.

The appliance base 100 represents any cordless electrical product that can be powered by a removable power connector, such as the coupler 102. Such cordless appliances are capable of being powered from a mains power supply (i.e. 100V-240V), and includes for example blenders, toasters, mixers, and kettles. The appliance base 100 includes a user input means (e.g. a dial 104, buttons, a display, and/or a touch screen). The appliance base 100 includes a complementary coupler 114 which is configured to engage the coupler 102 to deliver mains power to the appliance base 100.

The coupler 102 includes a body 106 and an electricity supply cable 108, which extends from the body 106 and can be connected to a power outlet via a plug (not shown).

The body 106 of the coupler 102 includes a power terminal 110 and a magnetic coupling region 111 disposed concentrically around an outer periphery of the power terminal 110.

The power terminal 110 is configured to engage a complementary power terminal 116 of the complementary coupler 114 to provide an electrical connection from the mains power supply to the appliance base 100. In this embodiment, the power terminal 110 includes a pair of symmetrically configured concentric power terminals. The complementary power terminal 116 is configured to engage with the symmetrically configured concentric power terminals 110 of the coupler 102. The power terminal 110 and complementary power terminal 116 may be sourced from any original equipment manufacturer. An example arrangement of the power terminal 110 and the complementary power terminal 116 is described in WO1995/008204, filed on 15 Sep. 1994, the contents of which are herein incorporated by reference.

The magnetic coupling region 111 of the coupler 102 is configured to be attracted to and engage, via a magnetic force, an engaging region 118 on the complementary coupler 114. Mutual attraction between the magnetic coupling region 111 and the engaging region 118 assists to align the coupler 102 for connection with the complementary coupler 114, and thereby engages the power terminal 110 and complementary power terminal 116 and establishes an electrical connection between the coupler 102 and the appliance base 100.

In this embodiment, the magnetic coupling region is annular in shape and includes a plurality of permanent magnets 112 defining an annular area. The magnets 112 engage engaging region 118 of the complementary coupler 114. In other embodiments, the magnet may be a single annular magnet disposed on the magnetic coupling region 111. Electromagnets may also be used.

The engaging region 118 is configured to correspond to the magnetic coupling region 111. The engaging region 118 may be ferromagnetic or may comprise one or more permanent magnets. In other embodiments the magnetic coupling region 111 may be placed on the complementary connection means 114 of the appliance base 100, and the engaging region 118 is then provided on the coupler 102.

Figure 3:
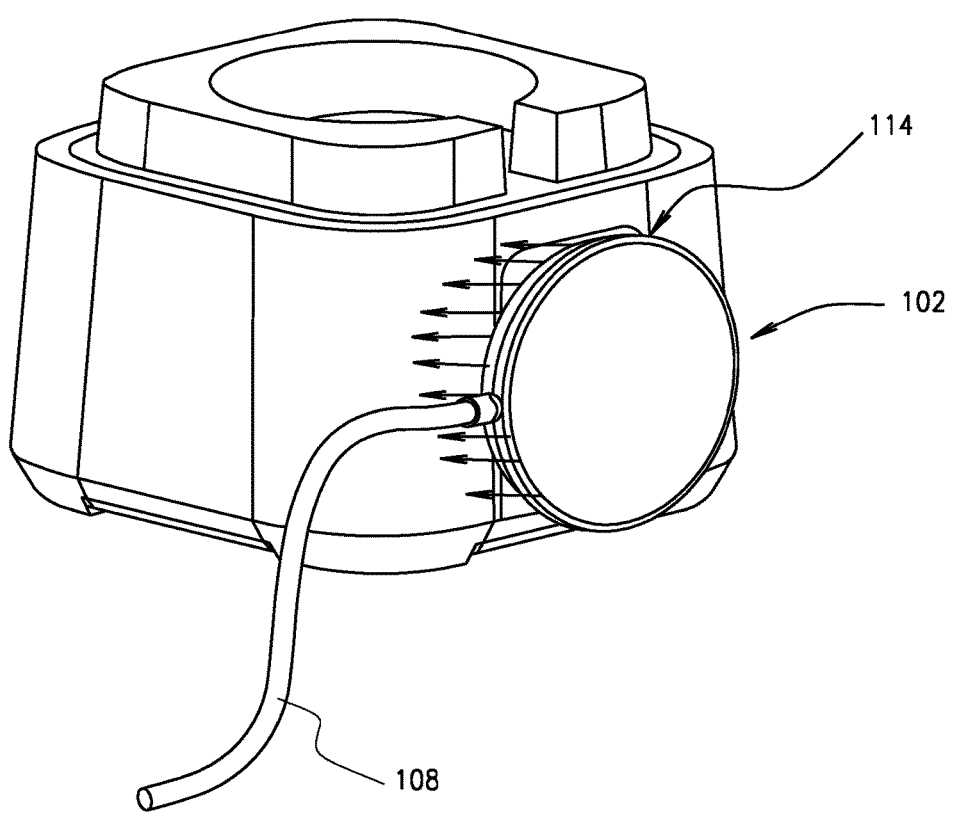
FIG. 3 shows a rear perspective view of the coupler attached to the appliance base.
Figure 4:
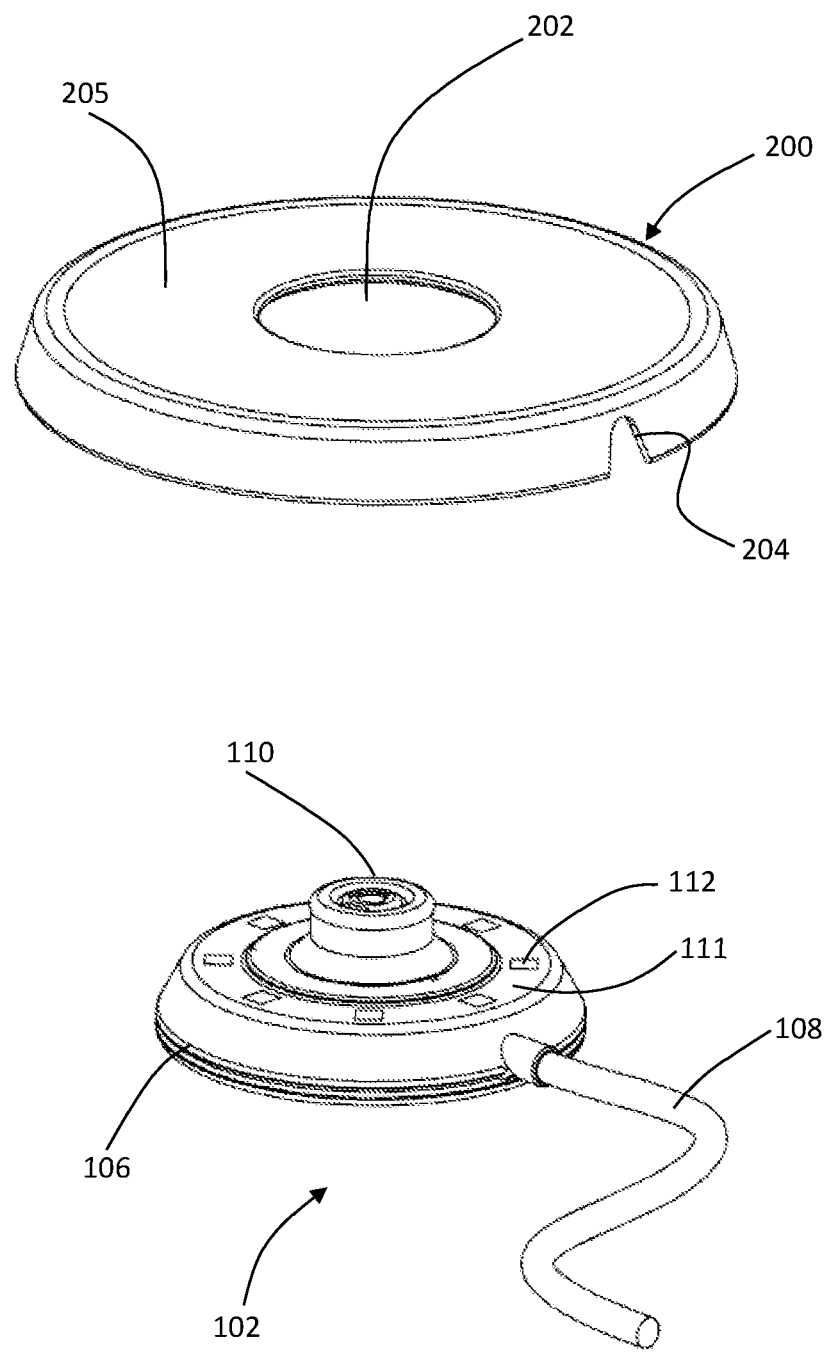
FIGS. 4 to 7 show the power coupler and an adapter base.
Figure 5:
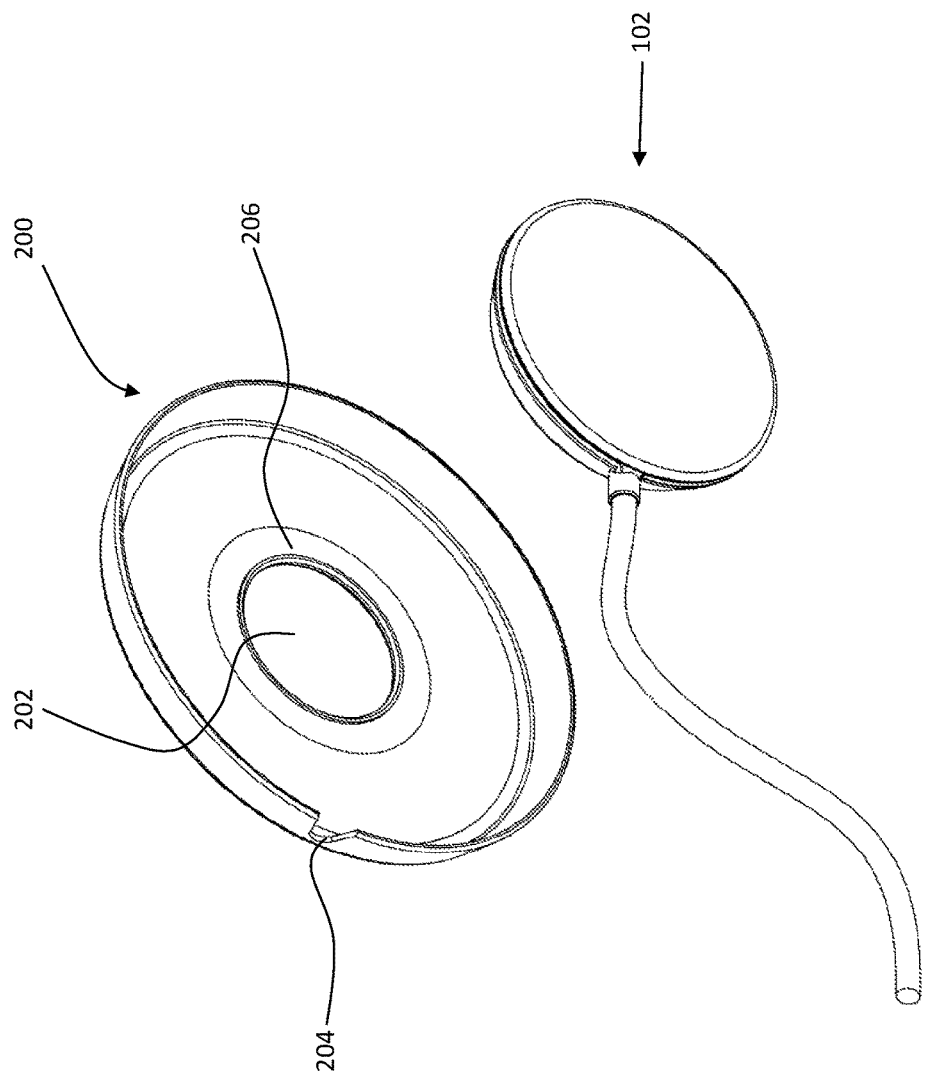
Figure 6:
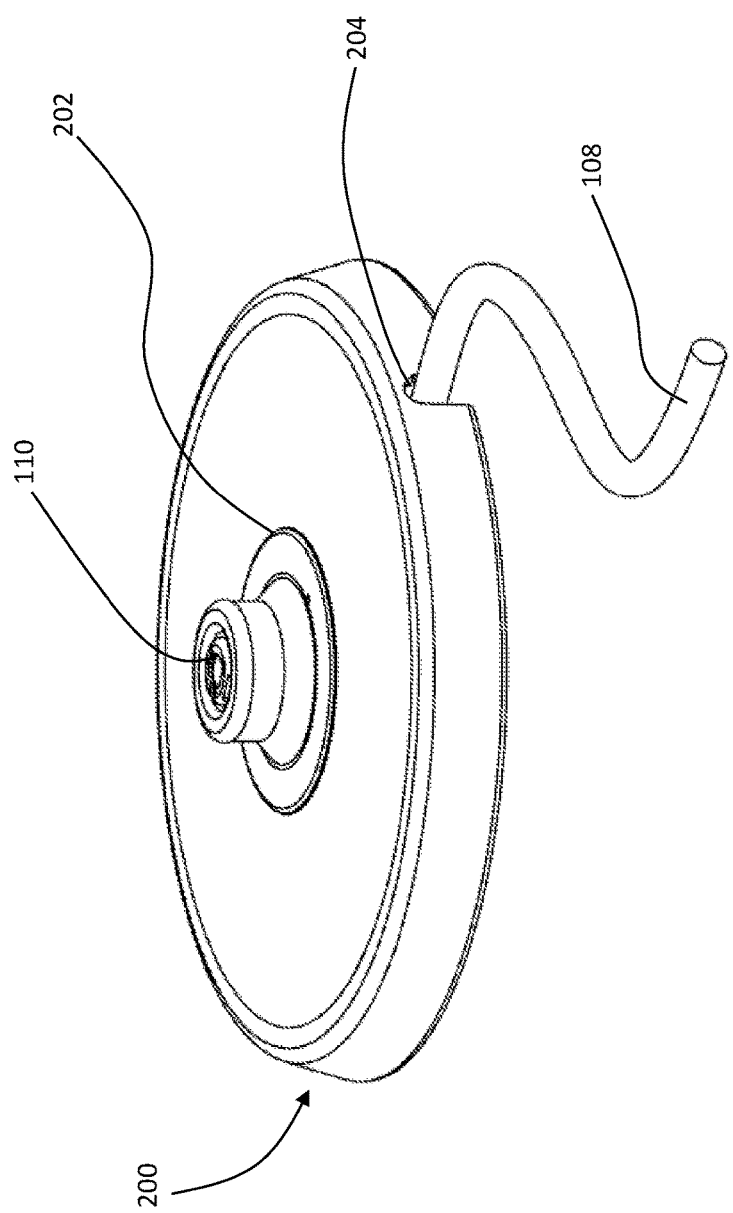
Figure 7:
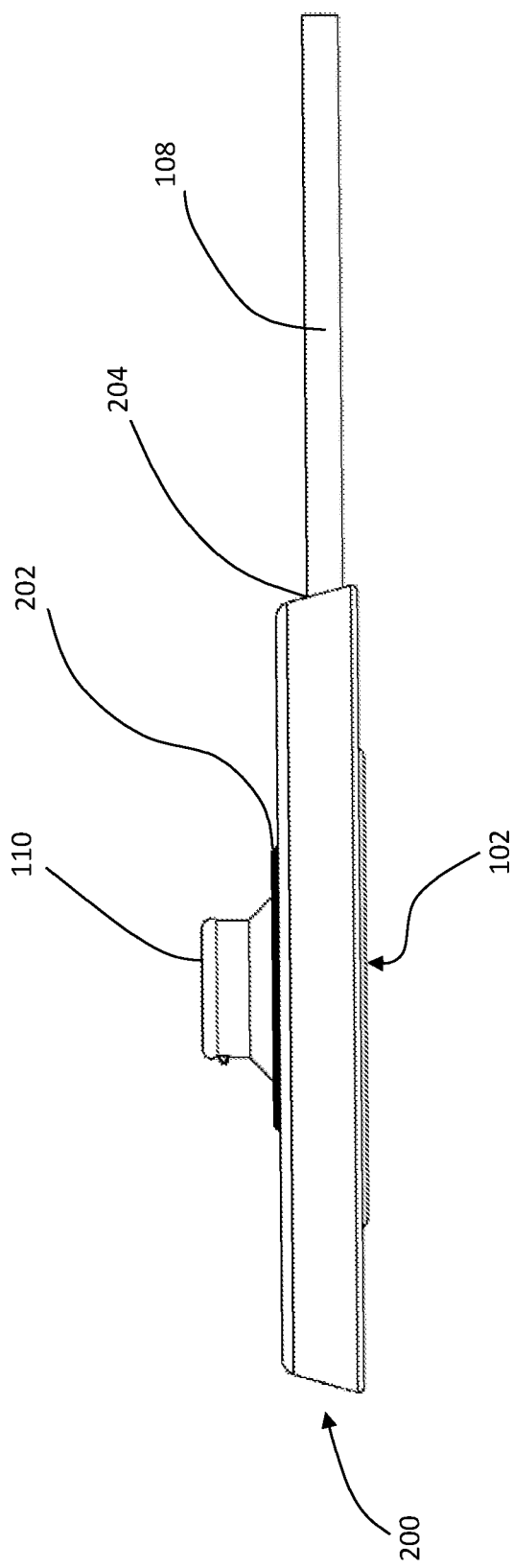
Figure 9:
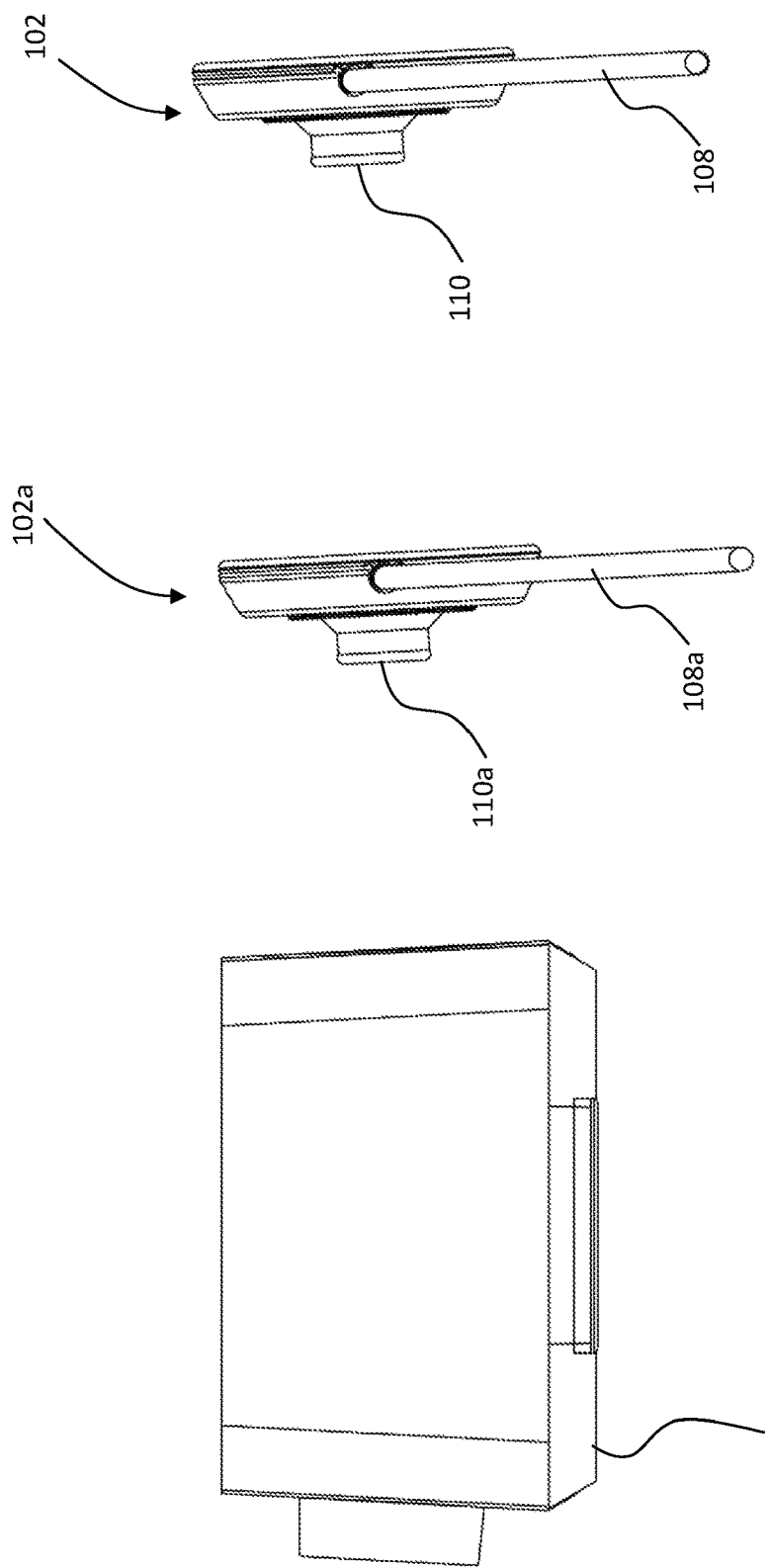
Figure 10:
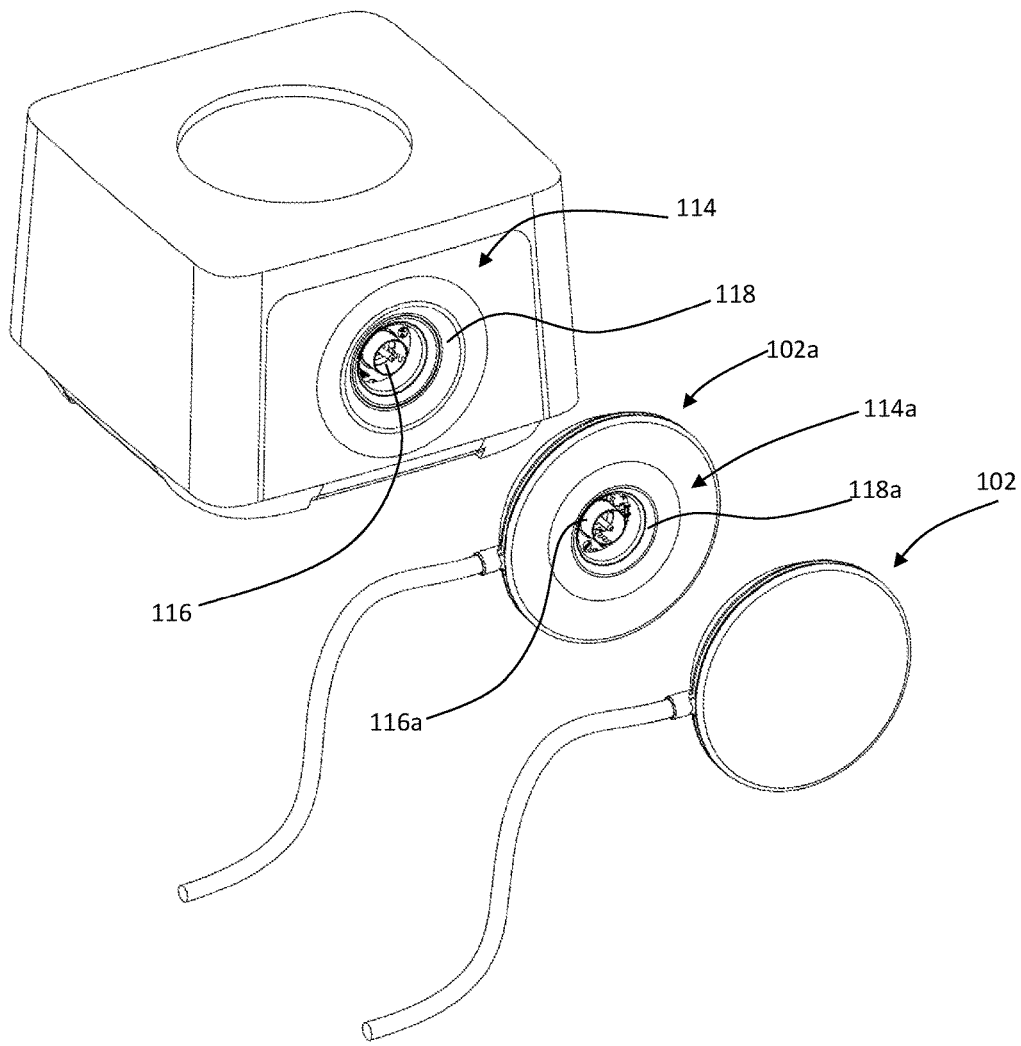
Figure 11:
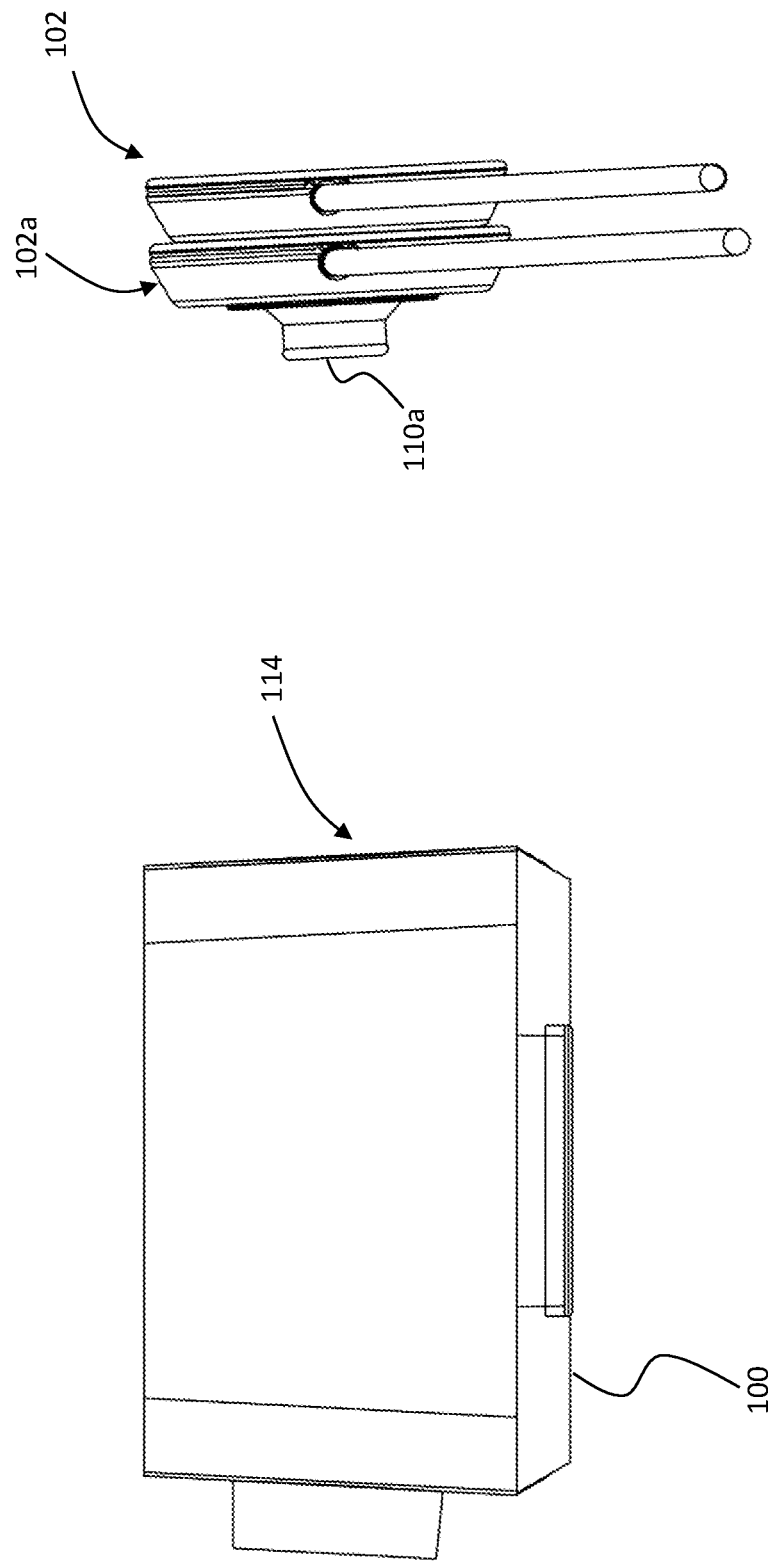

FIGS. 1 to 3 show the coupler 102 capable of attaching to a nearly vertical side surface of the appliance base 100. The arrows in FIG. 3 illustrate the magnetic force of attraction between the coupler 102 and the appliance base 100. Accordingly, in use, the coupling between the magnetic coupling region 111 and the engaging region 118 allows the coupler 102 to engage the appliance 100 on a non-horizontal surface.

Adapter Base

Referring to FIGS. 4 to 7, the coupler 102 is shown in an arrangement where the coupler 102 is adapted to engage with a base of a cordless appliance using an adapter base 200.

In one embodiment, the adapter base includes a planar surface 205 that in use supports the cordless appliance. The planar surface defines an aperture 202 and a cable notch 204.

The coupler 102 (e.g. as described with reference to FIGS. 1 to 3) includes the power terminal 110 that in use is connected to a mains power source. In use the coupler 102 is positioned such that the power terminal 110 is accessible via the aperture 202 such that complementary power terminal (e.g. the complementary power terminal 116) on the cordless appliance engages the power terminal 110 to establish an electrical connection between the coupler 102 and the cordless appliance. For example, the adapter base 200 and the coupler 102 are co-located such that the power terminal 110 is accessible through the aperture 202. The electricity supply cable 108 is also positioned to fit within the cable notch 204. This allows the adapter base 202 to be positioned over the coupler 102.

As previously described, the coupler includes magnetic coupling region 111 disposed concentrically around an outer periphery of the power terminals 110. In use, as the appliance is positioned over the adapter base 200, the magnetic coupling region 111 provides a mutual attraction between the magnetic coupling region 111 and a complementary engaging region disposed concentrically around the complementary power terminals on the cordless appliance (e.g. complementary engaging region 118), thereby engaging the power terminals and establishing an electrical connection between the coupler 102 and the cordless appliance.

In another embodiment, the adapter base 200 includes an engaging region 206 disposed concentrically around the aperture 202 of the adapter base 200. The engaging region 206 is configured to engage the magnetic coupling region 111 of the coupler 102. This provides a magnetic attachment between the coupler 102 and the adapter base 200 thereby engaging the coupler and the adapter base.

In a further embodiment, the coupler 102 includes a first coupling means disposed concentrically around an outer periphery of the power terminal 110. The first coupling means is configured to engage a second coupling means disposed around the aperture 202. The first and second coupling means interact to attach the coupler 102 to the adapter base 200 such that the concentric power terminals 110 are accessible via the aperture 202. As a result, the complementary power terminal 116 on the cordless appliance engage with the concentric power terminal 110 to establish an electrical connection between the coupler 102 and the cordless appliance.

The first coupling means may include a magnetic coupling region (e.g. the magnetic coupling region 111), which may comprise one or more permanent magnets (e.g. magnets 112) or electromagnets. The second coupling means may comprise a ferromagnetic material, or a permanent magnet (e.g. the engaging region 118). Alternatively or additionally, the first and second coupling means may comprise a bayonet attachment, one or more snap clips or a 360 degree ball lock.

The adapter base 200 may also include a housing within which the electricity supply cable 108 may be retracted.

In another embodiment, the coupler 102 may also attach to the bottom surface of an appliance without the use of the adapter base 200. For example, small appliances may rest on the magnetic coupling region 111, while larger appliances may include feet which rest on a surface while supporting the appliance on top of the coupler 102.

Pass-Through Arrangement

FIGS. 8 to 11 show a "pass-through" arrangement where a coupler 102 (as previously described) and a "pass-through" coupler 102A are configured to be joined. This arrangement provides a stacked magnetic coupling system for providing mains power to a plurality of appliances from a single power outlet. The "pass-through" coupler 102A includes an electricity supply cable 108A, a power terminal 110A, and a magnetic coupling region 111 with magnets 112, similar to the coupler 102 previously described. The "pass-through" coupler 102A also includes a complementary coupler 114A which includes complementary power terminals 116A and an engaging region 111A (see FIG. 10). The complementary coupler 114A on the "pass-through" connector 102A is similar to the arrangement of the complementary coupler 114 on the appliance base 100.

This arrangement allows for a coupler 102 to attach to the complementary coupler 114A of the "pass-through" connector 102A by the mutual attraction between the magnetic coupling region 111 and the engaging region 118A. In use, the coupler 102 is connected to the mains power outlet (via a plug on the electricity supply cable 108) in order to provide mains power to an appliance connected to the electricity supply cable 108A of the "pass-through" connector 102A, and the appliance of the appliance base 100. For example, the "pass-through" arrangement may be used to power appliances which are accessories or related to the appliance of the appliance base 100.

The lead 108A may be used to power an additional device (not shown). For example, the two couplers 112, 112A may be used to power a kettle and a toaster. The second device may be a powered accessory of the first device. In one arrangement the lead 108A terminates in a coupler that attaches to the appliance using a magnetic force.

Additional couplers may be stacked together, enabling further appliances to be powered.

Coupler with Drainage System

Some domestic appliances, such as kettles, are often exposed to spilled liquids. FIGS. 12-17 illustrate an arrangement in which a coupler 302 is provided with a drainage feature that permits water or other liquids to escape from the coupler, where the coupler may be oriented horizontally or vertically.

Figure 12A:
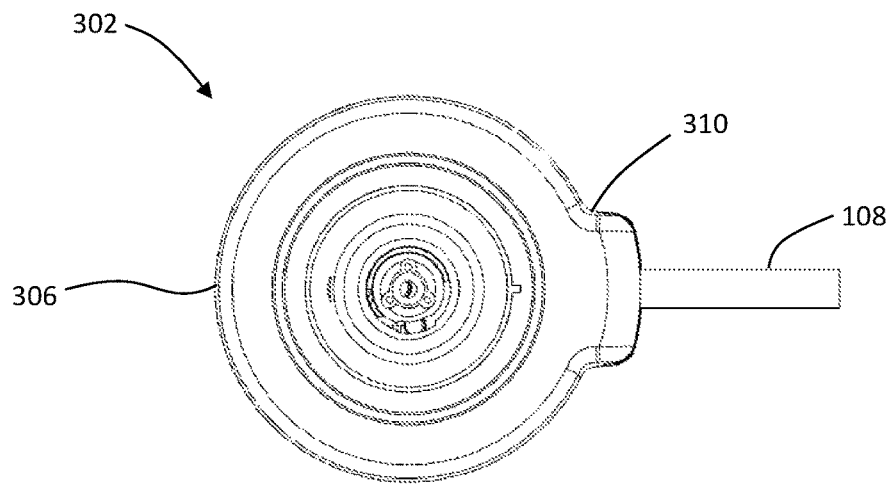
FIGS. 12A-C show, respectively, a top view, a side view and a bottom view of a coupler with a drainage feature.

FIG. 12A shows a top view of the coupler 302 having a body 306 that in the top view is substantially circular. The supply cable 108 enters the body 306 in a peripheral connection region 310. In the depicted arrangement, the region 310 protrudes beyond the outer diameter of the circular portions of the body 306.

Figure 12B:
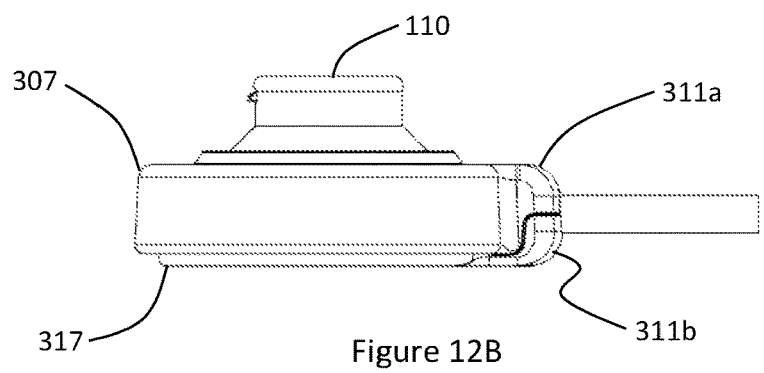
Figure 12C:
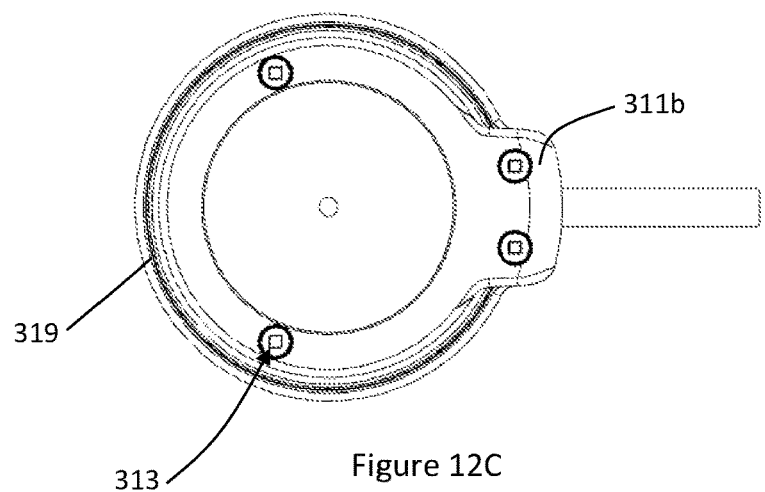

As seen in FIG. 12B, the body 306 has an upper housing 307, from which the power terminal 110 protrudes, and a lower housing 317 that forms a base of the coupler 302 so as to provide a cavity between the upper housing 307 and the lower housing 317. The connecting region 310 is made up of an upper part 311a that is part of the upper housing 307 and a lower part 311 b that is part of the lower housing 317.

The upper housing 307 and lower housing 317 are configured such that there is a gap 319 between the upper housing and lower housing that extends for a substantial proportion of the perimeter of the coupler 302. The gap 319 may be seen in the bottom view of FIG. 12C. Here, the gap 319 extends round the entire perimeter except for the connection region 311 b.

In this arrangement, there are four attachment means 313 used to connect the upper housing 307 and the lower housing 317. Two attachment means 313 are provided in the connection region 311b, and two further attachment means 313 are in the main circular, portion of the body 306. The attachment means may, for example, be screws, used to attach the different parts of the body 306 together.

Figure 13A:
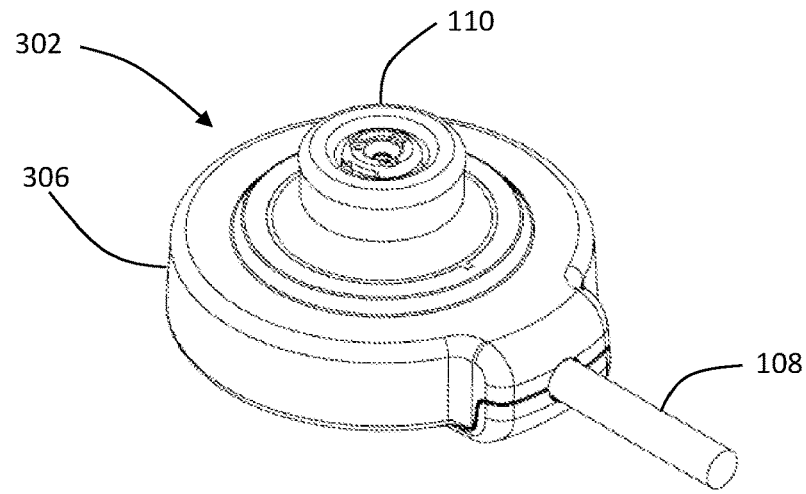
FIGS. 13A-C show a top perspective view and bottom perspective view of the coupler of 12A-C.
Figure 13B:
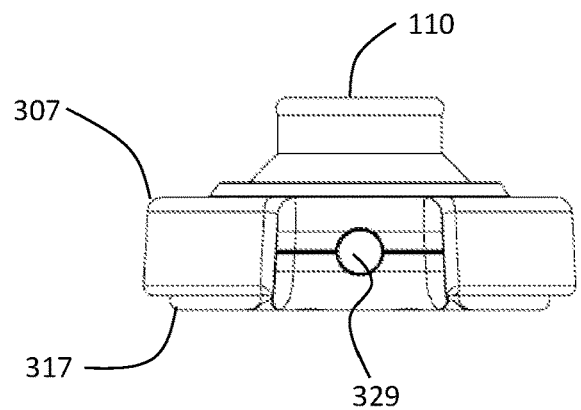
Figure 13C:
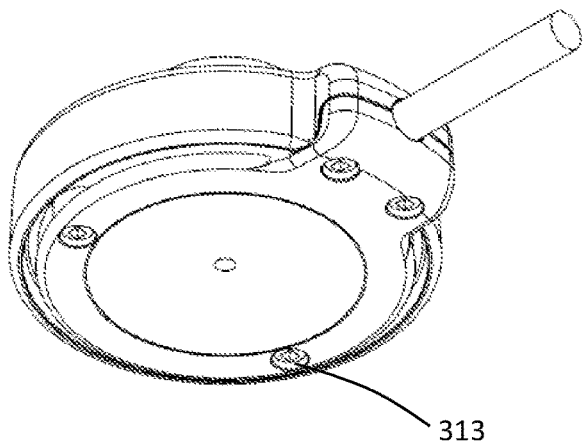

FIGS. 13A-C show perspective views of the coupler 302. The gap 319 may be seen in the bottom perspective view of FIG. 13C. As seen in the side view of FIG. 13C, the connection portions 311a and 311b define an aperture 329 sized to receive the supply cable 108.

FIG. 14 illustrates the location of the magnets and wiring inside the coupler 302. FIG. 14A shows a perspective view of the coupler 302. FIG. 14B shows a partial view of the coupler 302 with the upper parts of the body 306 removed to reveal the location of the magnets 112. FIG. 14C shows a top view with the housing removed, to illustrate the relative disposition of the magnets. It may be seen that the magnets 112 are positioned closer to one another in the vicinity of the cable 108. Having the number of magnets biased towards the location of the supply cable 108 assists in preventing forces on the cable pulling the connector 302 away from the appliance 100. It is considered more likely that forces will be applied to the cable in the region of the cable attachment than to the portion of the coupler 306 opposite the connection region 310.

In the depicted arrangement there are eight magnets 112, in a configuration that is mirrored above and below a centre line defined by the axis of the cable 108. There are four magnets in the upper half of the body. Two magnets are positioned in the vicinity of the cable 108, the third magnet is located at approximately 90° to the axis of the cable 108, and the fourth magnet is positioned at approximately 120° to the axis of the cable 108. The arrangement in the lower half of the body mirrors that of the upper half.

Figure 14A:
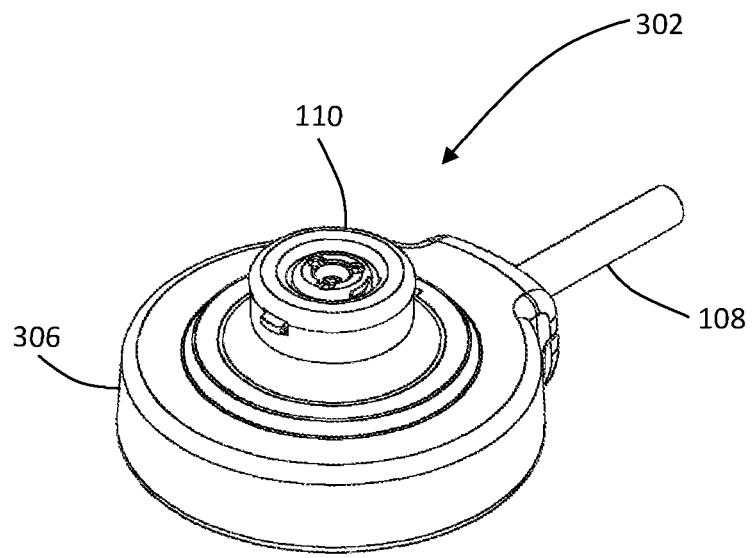
FIGS. 14A-D show views of the coupler of FIGS. 12 and 13 with an upper housing removed to illustrate an asymmetrical arrangement of interior magnets.
Figure 14B:
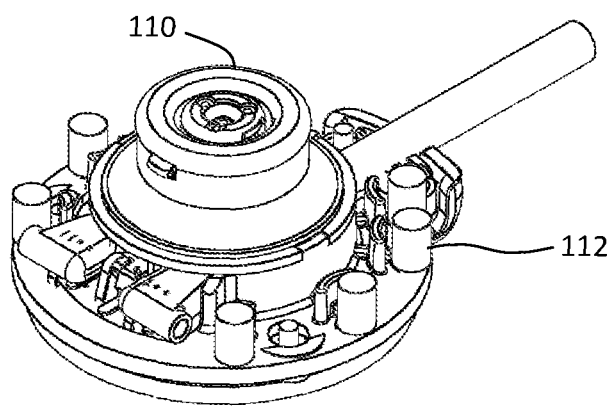
Figure 14C:
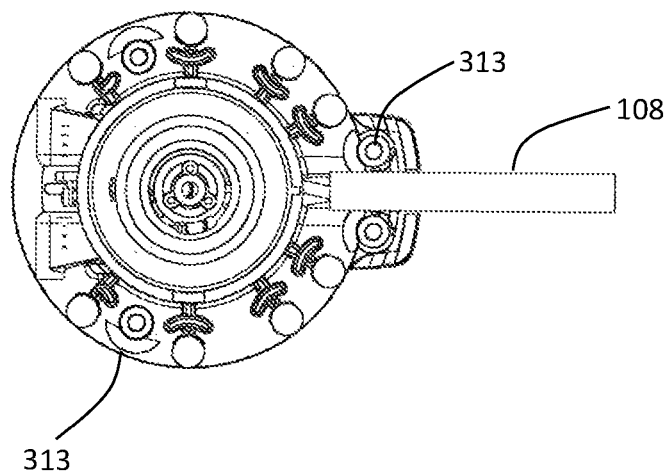
Figure 14D:
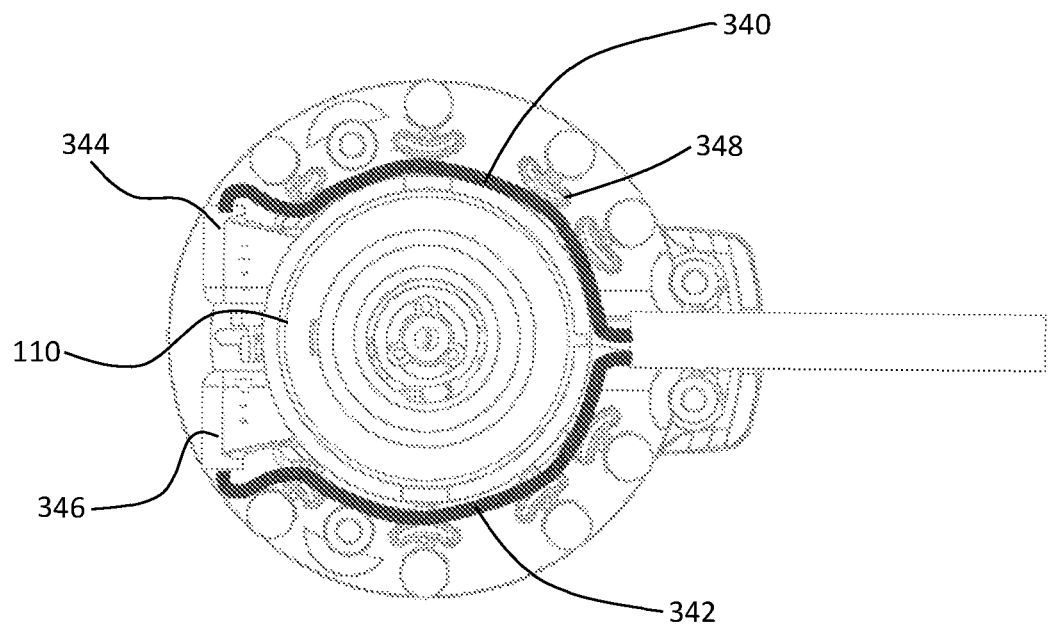

Associated with each magnet 112 is a rib 348, located radially inward of the associated magnet. As seen in FIG. 14D, wiring 340 is routed from the cable 108 to a terminal 344 of the power terminal 110, and wiring 342 is routed from the cable 108 to a terminal 346 of the power terminal 110. The ribs 348 serve to hold the wiring 340, 342 in place within the middle housing (described below). This reduces the chance of the wiring 340, 342 being pinched between parts of the housing 306 when the coupler 302 is assembled.

The coupler 302 also includes a middle housing 327 that is positioned within the cavity forming between the upper housing 307 and the lower housing 317. The middle housing 327 contains the magnets 112 and the wiring 340, 342 between the electricity supply cable 108 and the power terminal 110. The middle housing 327 serves to isolate the wiring and magnets from liquids that flow through the body 306.

Figure 15A:
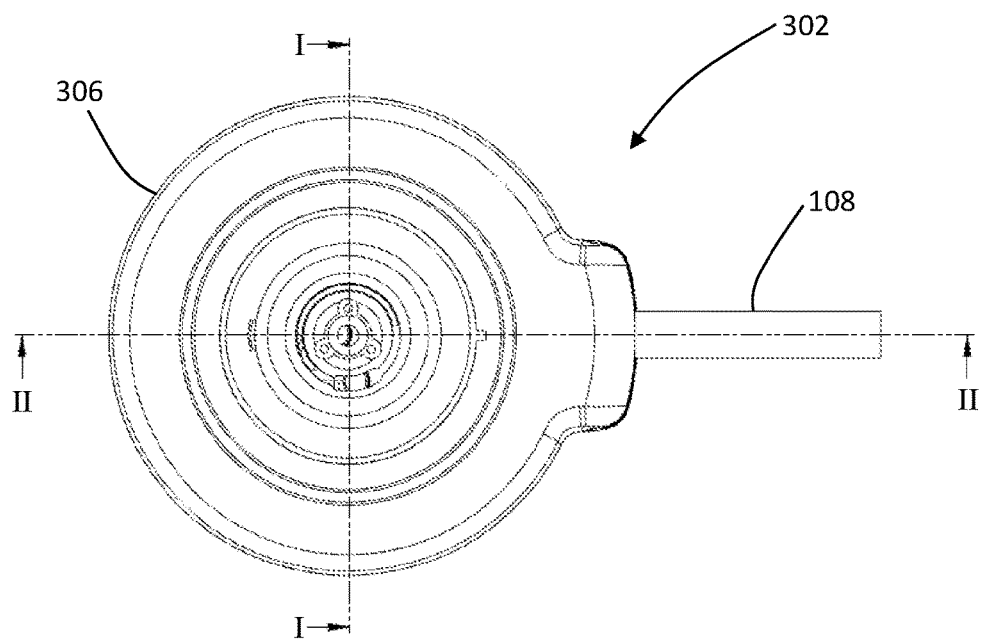
FIG. 15A is a top view of the coupler.
Figure 15B:
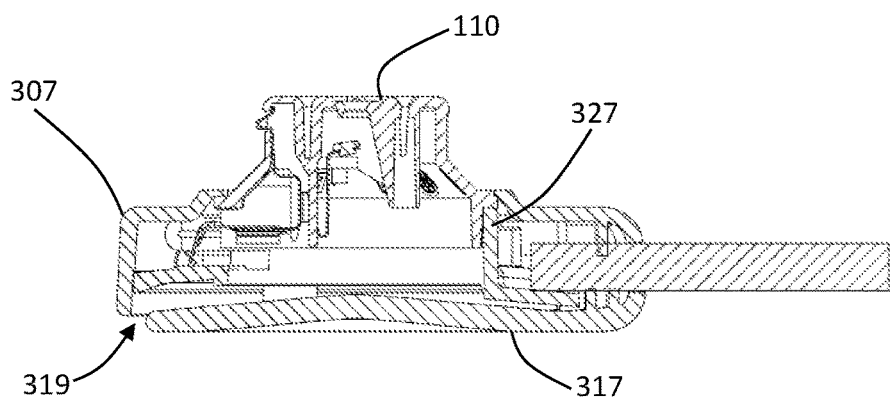
FIGS. 15B and 15C are sectional views of the coupler of FIG. 15A, sectioned along lines II-II and I-I respectively.
Figure 15C:
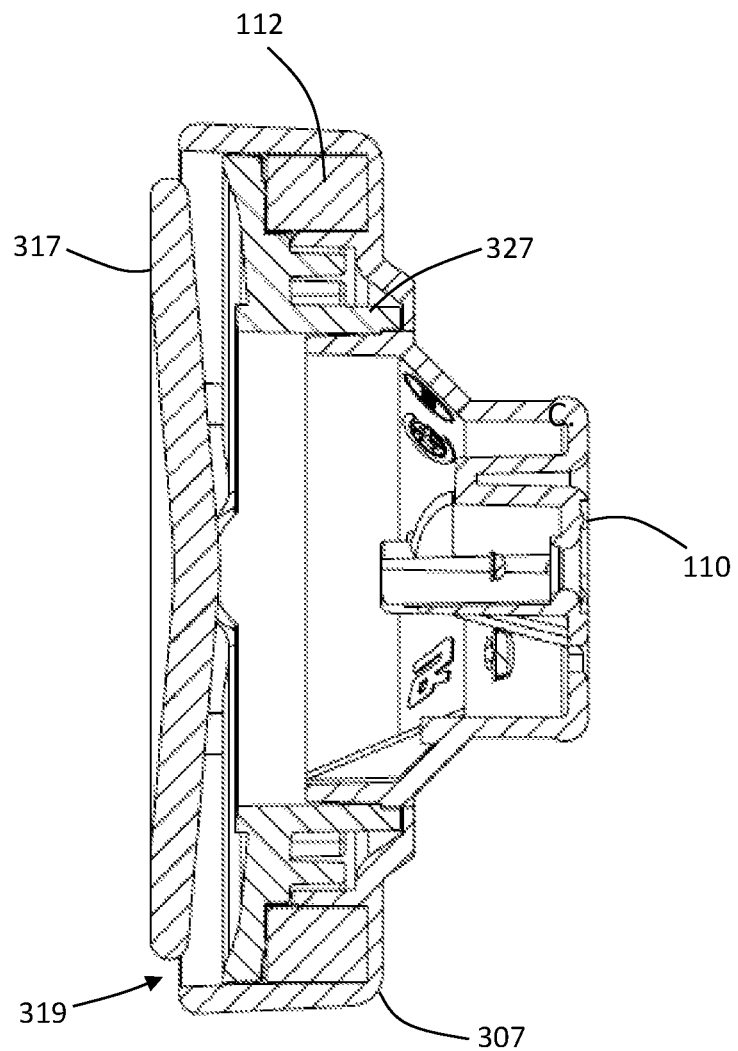

The structure of the housing 306 is illustrated in FIG. 15, sectioned along the lines I-I and II-II shown in the plan view of FIG. 15A. The middle housing 327 is generally annular in shape, and is positioned around the periphery of the upper housing 307 to form a generally annular enclosed portion of the body 306. As may be seen in FIG. 15B, where the cable 108 enters the coupler 302 the connection region lies between the middle housing 327 and the upper housing 307. As may be seen in FIG. 15C and FIG. 16A, the magnets 112 are also located in the enclosed space defined by the upper housing 307 and the middle housing 327.

In the sectional views it may be seen that the lower housing 317 has a generally conical shape, with the apex of the cone lying at or near the centre of the body 306. The lower housing 317 slopes away from the apex towards the periphery of the housing, defining the lower side of the gap 319 between the upper housing 307 and the lower housing 317. The incline of the conical lower housing is at least 3°. The incline of at least 3° is considered to facilitate liquid drainage when the coupler 302 is used in a horizontal configuration. It is advantageous that the gap 319 runs around the greater portion of the perimeter of the coupler 302, to facilitate drainage of liquid from the housing 306.

Figure 16A:
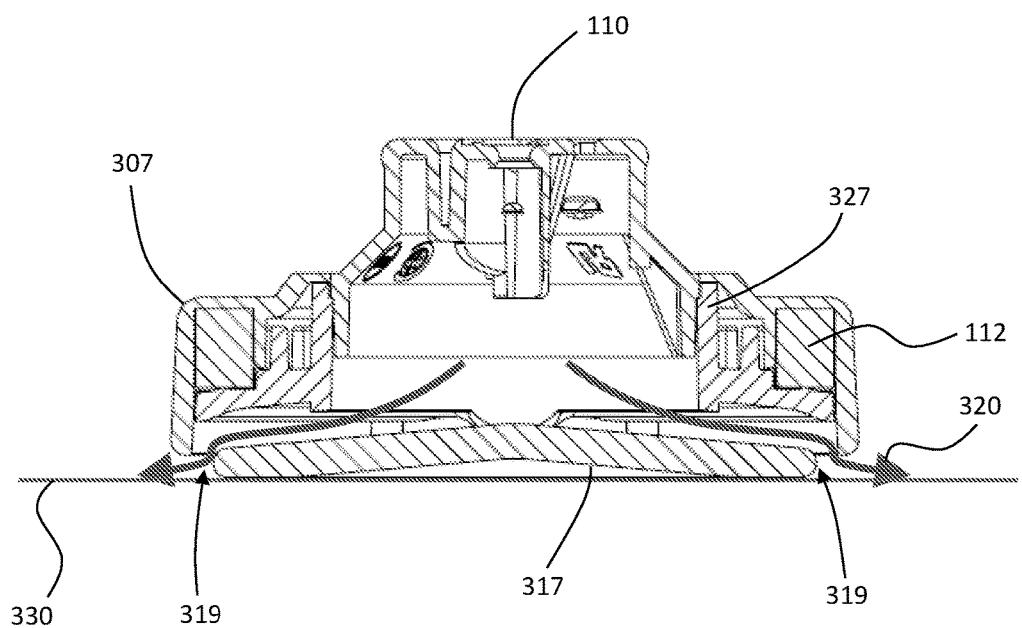
FIG. 16A is a sectional view of the coupler of FIGS. 12-15, illustrating water drainage when the coupler is placed horizontally.

FIG. 16A is a further sectional view of the coupler 302 in use on a horizontal surface 330, for example a kitchen counter. The arrows 320 in FIG. 16A illustrate the flow of liquid through the gap 319.

Figure 16B:
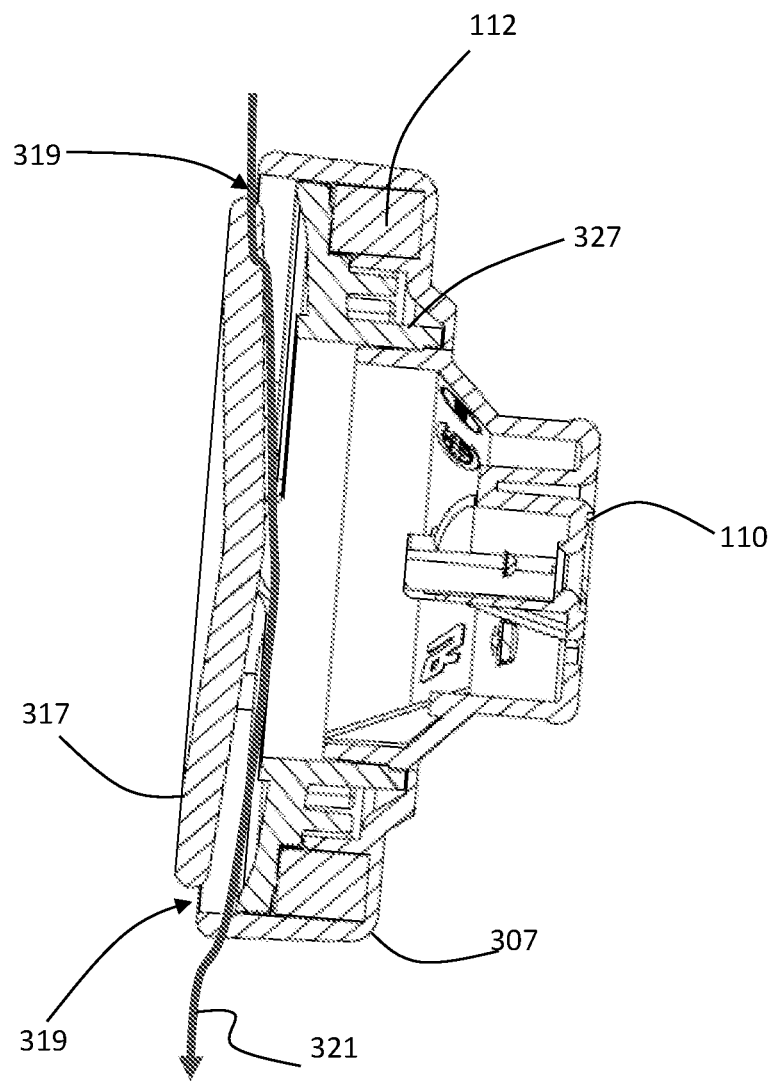
FIG. 16B is a sectional view of the coupler illustrating water drainage when the coupler is in a nearly vertical configuration.

FIG. 16B shows a further sectional view of the coupler 302 in use in a substantially vertical orientation. This could be, for example when the coupler 302 is coupled to the appliance base 100. The arrow 321 illustrates how liquid may drain from the operationally lower part of the coupler 302 in a substantially vertical configuration.

Figure 17A:
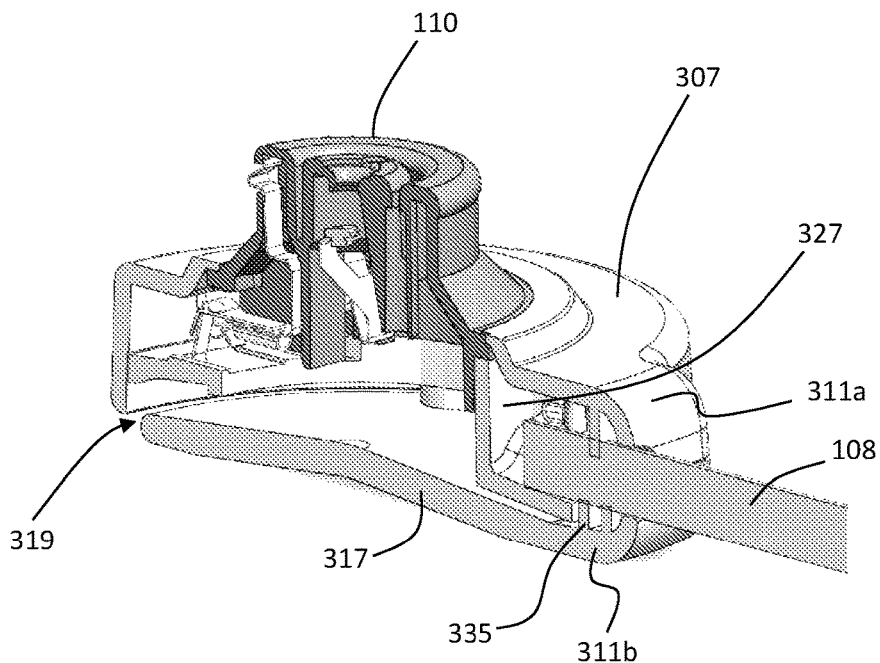
FIGS. 17A and B are sectional views of the coupler of FIGS. 12-16.

FIG. 17A is another sectional view of the coupler 302, showing the relative positions of the upper housing 307, the middle housing 327 and the lower housing 317. The sectional view illustrates the connection portion defined by the region 311a of the upper housing 307 and region 311b of the lower housing 317. The region 311b of the lower housing 317 includes two tabs 335 that in use assist in securing the supply cable 108. A complementary tab is formed on the region 311a of the upper housing 307, to assist in clamping the cable 108 in place.

Figure 17B:
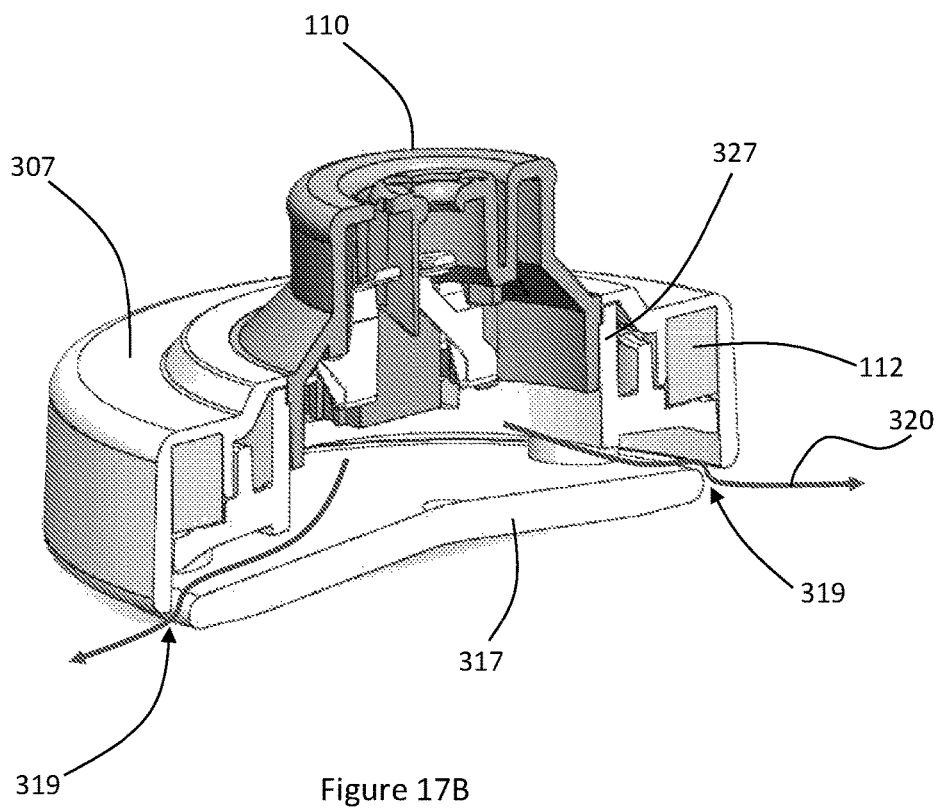

FIG. 17B shows a further sectional view of the coupler 302. Arrows 320 illustrate again how liquid flows through the gap 319 when the coupler 302 is in a horizontal configuration.

In an alternative configuration, the lower housing 317 is connected to the upper housing 307 at points away from the periphery of the lower housing. In this case, the gap may extend around the entire periphery of the coupler 302.

The couplers described herein may be used with many types of appliances. Examples of such appliances include: Multifunctional cookers and heating appliances; Kettles; Toasters; Slow Cookers; Pressure Cookers; Sandwich presses; Grills; Multifunctional kitchen machines; Blenders; Mixers; Food processors; Slicers; Combination appliances, and Heated and stirring appliances.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A system for providing mains power to a cordless appliance, the system comprising:
   a coupler comprising:
      a circular first power terminal and a second power terminal, wherein the second power terminal is positioned inside the circular first power terminal concentric with the first power terminal such that a combination of the first and second power terminals is symmetrical, wherein the first and second power terminals are connected to a main power source; and
      a magnetic coupling region disposed concentrically around an outer periphery of the power terminals;
   a complementary coupler on the appliance, comprising
      complementary power terminals configured to engage with the symmetrically configured concentric power terminals of the coupler; and
      an engaging region disposed concentrically around an outer periphery of the complementary terminals, wherein a magnetic force provides a mutual attraction between the magnetic coupling region and the engaging region, thereby engaging the power terminals and complementary power terminals and establishing an electrical connection between the coupler and the appliance in a manner that allows the coupler to rotate freely about the complementary coupler.

2. The system according to claim 1, wherein the magnetic coupling region comprises a plurality of permanent magnets defining an annular area.

3. The system according to claim 2, wherein the plurality of permanent magnets are circumferentially positioned at unequal intervals around the annular area.

4. The system according to claim 3, wherein the plurality of permanent magnets are positioned closer to one another in the vicinity of a supply cable that, in use, connects the power terminals to the mains power source.

5. The system according to claim 1, wherein, in use, the complementary coupling on the appliance is provided on a non-horizontal surface.

6. The system according to claim 1, further comprising an adapter base comprising a planar surface that in use supports the cordless appliance, the planar surface defining an aperture, wherein in use the coupler is positioned such that the concentric power terminals are accessible via the aperture such that the complementary power terminals on the cordless appliance are engageable with the concentric power terminals to establish an electrical connection between the coupler and the cordless appliance.

7. The system according to claim 1, the coupler having a body comprising an upper housing and a lower housing, wherein a gap is formed between said upper housing and said lower housing so as to extend along at least a portion of the perimeter of the coupler body and thereby enable liquid to flow out of the coupler body.

8. A coupler for providing mains power to cordless appliances in a plurality of attachment configurations, the coupler comprising a circular first power terminal and a second power terminal, wherein the second power terminal is positioned inside the circular first power terminal concentric with the first power terminal such that a combination of the first and second power terminals is symmetrical, wherein the first and second power terminals are connected to a main power source, and a magnetic coupling region disposed concentrically around an outer periphery of the power terminals;

wherein in a first attachment configuration the coupler is attached to a complementary coupler on a first cordless appliance, the complementary coupler having complementary power terminals configured to engage with the symmetrically configured concentric power terminals of the coupler and a first engaging region disposed concentrically around an outer periphery of the complementary terminals, wherein a magnetic force provides a mutual attraction between the magnetic coupling region and the first engaging region, thereby engaging the power terminals and complementary power terminals and establishing an electrical connection between the coupler and the first cordless appliance in a manner that allows the coupler to rotate freely about the complementary coupler.

9. The coupler according to claim 8, wherein, in a second attachment configuration, the coupler is attached to an adapter base having a planar surface that in use supports a second cordless appliance, the planar surface defining an aperture with a second engaging region disposed around the aperture, wherein a magnetic attraction between the magnetic coupling region and the second engaging region acts to attach the coupler to the adapter base such that the concentric power terminals are accessible via the aperture such that complementary power terminals on the second cordless appliance are engageable with the concentric power terminals to establish an electrical connection between the coupler and the second cordless appliance.

10. The coupler according to claim 9, wherein, in a third attachment configuration, the coupler is attached to a second adapter base having a planar surface that in use supports a third cordless appliance, the planar surface defining an aperture, wherein in use the coupler and the second adapter base are co-located such that the concentric power terminals are accessible via the aperture and a magnetic attraction between the magnetic coupling region and a second engaging region on the third cordless appliance acts to attach the coupler to the third cordless appliance such that complementary power terminals on the third cordless appliance are engageable with the concentric power terminals to establish an electrical connection between the coupler and the third cordless appliance.

11. The coupler according to claim 10, the coupler having a body comprising an upper housing and a lower housing, wherein a gap is formed between said upper housing and said lower housing so as to extend along at least a portion of the perimeter of the coupler body and thereby enable liquid to flow out of the coupler body.

12. The coupler according to claim 11, wherein the gap extends along the entire length of the perimeter of the coupler body except for a peripheral connecting region where a supply cable enters the coupler body.

13. The coupler according to claim 11, wherein the gap extends along the entire length of the perimeter of the coupler body.

14. The coupler according to claim 11, wherein the coupler body has a substantially circular shape in plan view and further comprises a middle housing positioned within a cavity formed between the upper housing and the lower housing so as to extend along the interior periphery of the upper housing, the middle housing containing wiring that extends from a supply cable that enters the coupler body to the power terminal, such that said wiring is isolated from any liquids that flow through the coupler body.

15. The coupler according to claim 14, wherein the lower housing has a substantially conical shape with an apex located at a substantially radial centre of the coupler body.

16. The coupler according to claim 15, wherein the incline of the conical lower housing is at least 3 degree.

17. A stacked magnetic coupling system for providing mains power to a plurality of appliances, the system comprising:

a first coupler comprising
a circular first power terminal and a second power terminal, wherein the second power terminal is positioned inside the circular first power terminal concentric with the first power terminal such that a combination of the first and second power terminals is symmetrical, wherein the first and second power terminals are connected to a main power source, and
a first magnetic coupling region disposed concentrically around the first set of power terminals;

a second coupler comprising
a complementary circular first power terminal and a complementary circular second power terminal, wherein the complementary second power terminal is positioned inside the complementary first power terminal and configured to engage with the first set of power terminals; and
a first engaging region disposed concentrically around the complementary terminals, wherein a magnetic force provides a mutual attraction between the first magnetic coupling region and the first engaging region, thereby engaging the first set of power terminals and the complementary terminals and establishing an electrical connection between the first coupler and the second coupler;

a second set of symmetrically configured power terminals that in use are coupled to corresponding terminals on a further coupler or on a first appliance;

a second magnetic coupling region disposed concentrically around the second set of power terminals, wherein the second magnetic coupling region provides a mutual attraction with a corresponding second engaging region on the further coupler or the first appliance, thereby engaging the second set of power terminals and the corresponding terminals and establishing an electrical connection between the second coupler and the further coupler or the first appliance in a manner that allows the second coupler to rotate freely about the further coupler or the first appliance; and a lead providing an electrical connection between the second coupler and a second appliance.

18. The system according to claim 17, wherein the first and second magnetic coupling regions are disposed around the outer periphery of first and second set of power terminals.

19. The system according to claim 18, wherein the couplers are symmetrically configured so that they are able to connect at any (0-360) coupling orientation.

20. The system according to claim 19, wherein the system includes a lead which terminates in a coupler corresponding to the first coupler.

* * * * *